March 26, 1957 J. W. H. MORGAN 2,786,951
DYNAMO-ELECTRIC MACHINES
Filed May 10, 1954 3 Sheets-Sheet 3

2,786,951
Patented Mar. 26, 1957

2,786,951
DYNAMO-ELECTRIC MACHINES

John William Harold Morgan, Stafford, England, assignor to The English Electric Company Limited, London, England, a British company Application May 10, 1954, Serial No. 428,621

Claims priority, application Great Britain May 18, 1953

9 Claims. (Cl. 310—61)

This invention relates to gas cooled dynamo-electric machines of the kind including a rotatable field member having a distributed concentric-coil type hollow conductor field winding. The invention is concerned with an improved arrangement for cooling the hollow conductors of the field winding.

According to the invention, a rotatable field member for a gas cooled dynamo-electric machine comprises a shaft portion and a slotted core portion, a distributed hollow-conductor field winding disposed in the slots and having overhang portions at each end of said core portion arranged so as to form, with the adjacent shaft portion of the field member, an annular intake space for cooling gas, each pole of the field winding being formed from a plurality of concentric coils, cover means having a cylindrical portion and an end portion for each of the winding overhang portions, gas-inlet means at each end of the field member for admitting cooling gas to the respective annular intake spaces, gas-inlet port means in both sides of at least some of the coils in the axially extending parts of each winding overhang portion arranged to communicate with the respective annular intake spaces, first gas-outlet means in the sides of each corresponding coil intermediate the ends of the core portion of the field member for exhausting some of the gas radially from the hollow conductors, second gas-outlet means in the circumferentially extending parts of each corresponding coil overhang portion arranged to extend axially through the winding overhang portion from the innermost coil provided with ports to the end portion of the adjacent cover means, and vent means in the end portion of each cover means disposed in alignment with the adjacent second gas-outlet means for exhausting the remainder of the cooling gas axially through the end portion of the cover means.

Other features of the invention will appear from the following description with reference to the accompanying drawings which illustrate the application of the invention to the field member of a two-pole hydrogen-cooled turbo-alternator.

Figure 1:
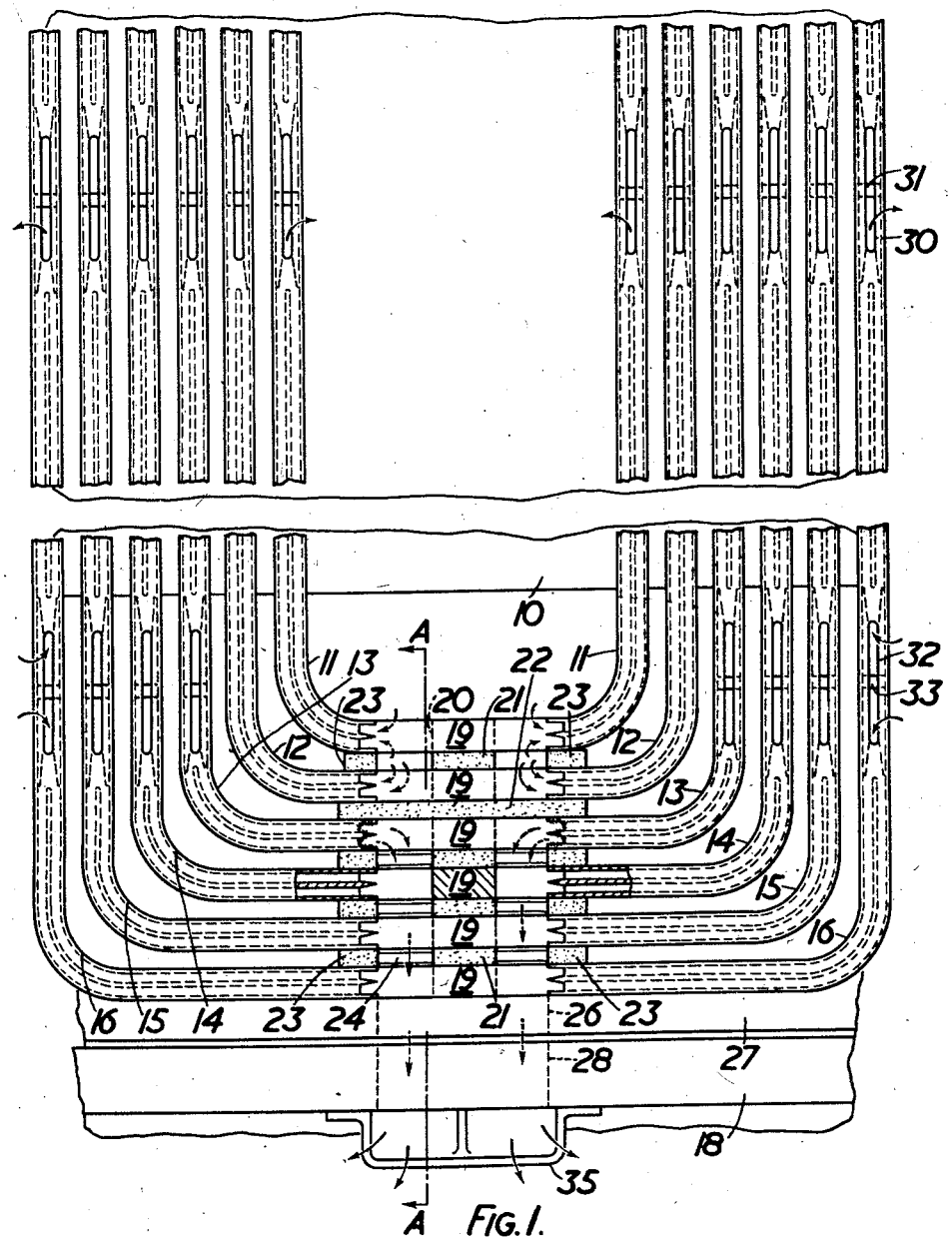
Figure 2:
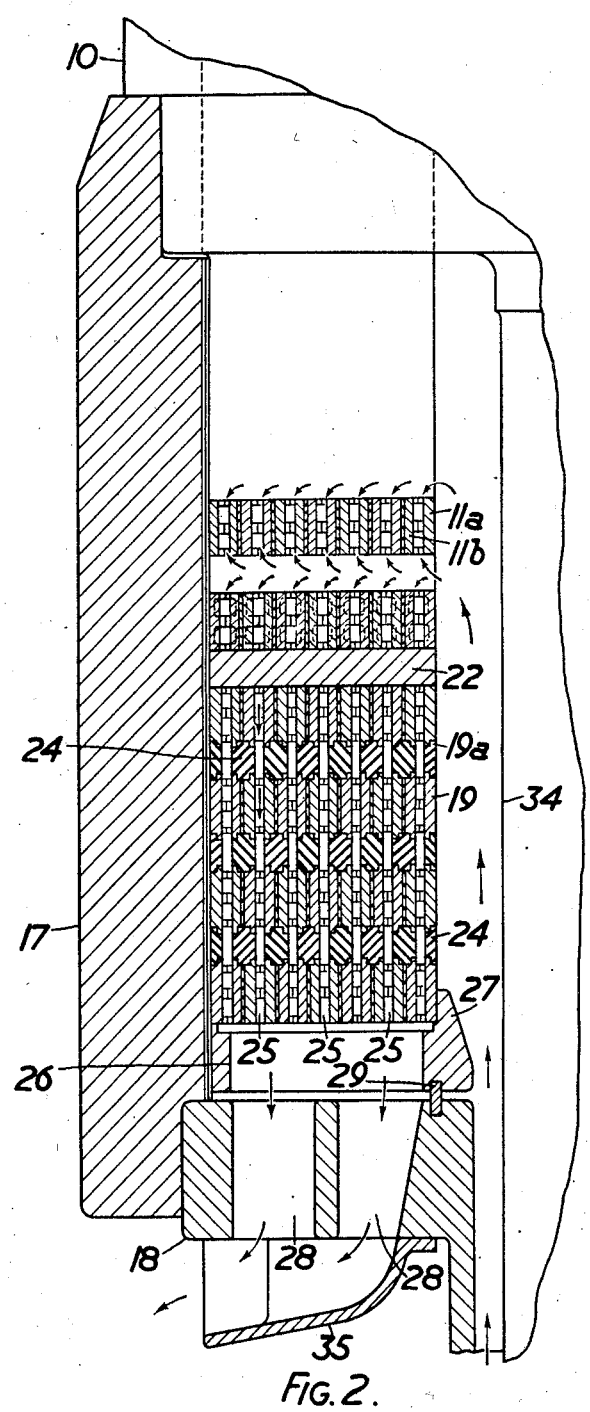
Figure 3:
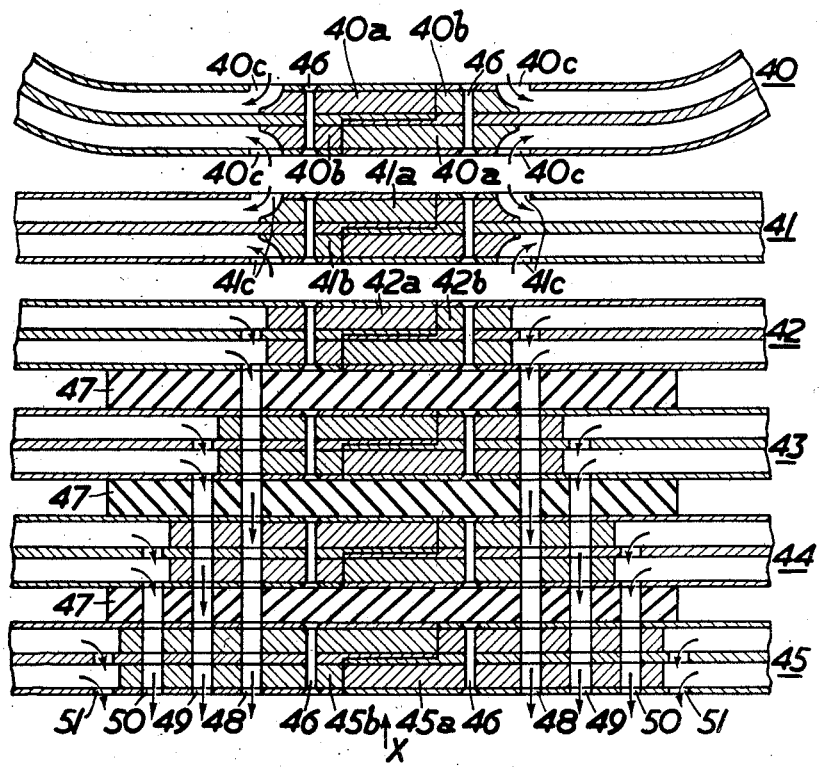
Figure 4:
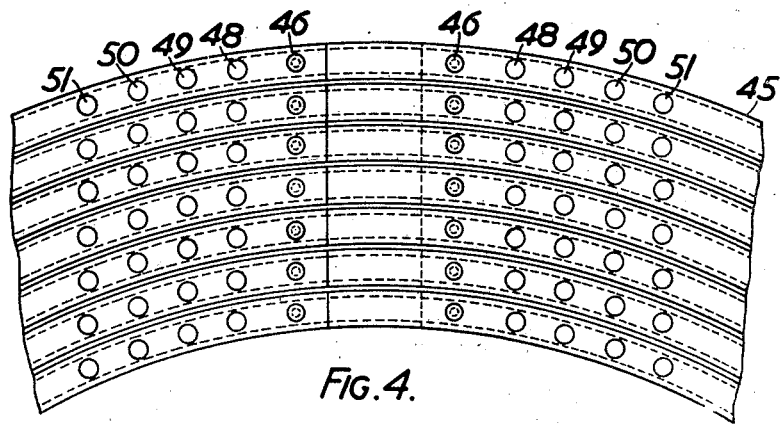

Fig. 1 is a developed plan view showing part of one pole of the field winding with the endbell removed, whilst Fig. 2 is a sectional elevation taken on the line A—A of Fig. 1. Fig. 3 is a sectional plan showing an alternative method of forming the ports in the circumferentially extending parts of the winding overhangs, whilst Fig. 4 is an end elevation looking in the direction of the arrow X of Fig. 3.

Referring now to Figs. 1 and 2, the rotor core portion is indicated at 10, whilst the separate coils of one pole of the winding are indicated at 11 to 16 respectively, each turn of the coils being made up from two double channel section conductors 11a, 11b, etc. disposed with the channels facing each other so as to form two ventilating ducts within each turn. The winding overhang is enclosed by an endbell 17 (shown in Fig. 2 only) which fits at one end on the rotor core portion and has fitted thereto at its other end a flanged end cover 18.

The turns of the coils are preformed as separate unstepped half turns which are fitted into the rotor slots, one at a time, and as the turns of each coil are assembled joint pieces 19 are brazed to the ends of the half-turns, the brazed joints being indicated by the lines of small crosses in coil 13 of Fig. 1. The joint pieces in the overhang shown in the drawings connect together the ends of the two half turns constituting a single turn whilst the joint pieces of the winding overhang at the opposite end of the rotor are stepped so as to join the end of each turn to the beginning of the next turn. Otherwise the two winding overhangs are identical. This method of fabricating the rotor coils is fully described in the co-pending patent application of John William Harold Morgan for Electrical Apparatus, Ser. No. 422,610, filed April 12, 1954. The joint pieces are slotted at each end as indicated by the reference 20, so as to form two sets of ports in the coils, one on each side of the pole centre-line.

During assembly of the coils packing pieces 21 and 22 of insulating material are fitted between the circumferentially extending parts of the winding overhangs and are arranged to extend the full depth of the winding. The packing pieces 21 are of the same width as the central unslotted portion of the joint pieces 19 whilst the packing piece 22 is wide enough to cover the slots 20 in the joint pieces of the winding layers 12 and 13. Further packing pieces 23, which also extend the full depth of the winding, are arranged in alignment with the ends of the half turns between the remaining layers.

The joint pieces 19 have ledges 19a formed thereon which serve to locate in position packing pieces 24 which are fitted between the coils 13 to 16 only, and which extend between the central packing pieces 21 and the outer packing pieces 23. The packing pieces 24 serve, together with the packing pieces 21 and 23, to define two sets of ducts 25 extending axially through the winding overhang from the coil 13 to the end ring 27. As will be seen from the drawings, each duct communicates with those conductors of the coils 13 to 16 which lie on the same radius. These ducts are arranged to be in alignment with slots 26 in an insulating end ring 27 and with slots 28 in the end cover 18. A spring-loaded seal 29 is provided between the end ring 27 and the end cover 28.

All the coils are slotted at the centre of the winding to provide radial ports 30, and in each of these ports there is fitted a central baffle 31 which extends the full depth of the winding. Further radial ports 32, together with central baffles 33, are provided in the coils 13 to 16 in the straight portions of the winding overhang. These ports are sealed off, at their outer ends, by the endbell.

In operation, hydrogen is fed through the clearance space at each end of the rotor between the respective end cover 18 and shaft portion of the rotor to each of the winding overhangs and enters the hollow turns of the coils 13 to 16 via the radial ports 32 in each of the winding overhangs, the baffles 33 serving to deflect some of the hydrogen towards the centre of the rotor where it is exhausted through the radial ports 30, and the remainder through the winding overhangs where it is exhausted axially through the ducts 25 and the slots 26 and 28 in the insulating rings 27 and the end covers 18 respectively. Cowls 35 fitted to the end covers 18 deflect the hydrogen issuing from the slots 28 radially outwards into the machine.

The coils 11 and 12 are cooled by the hydrogen which enters the turns of these coils through the horizontal slots 20 in the joint pieces of each winding overhang and is exhausted through the radial ports 30 at the centre of the rotor core. The hydrogen issuing from the cowls 35 at each end of the rotor and from the ports 30 is then fed back (by means not shown) to the clearance space between the end cover and shaft portion at each end of the rotor through a circuit including a heat exchanger, a continuous circulation of the hydrogen being thereby obtained.

Referring now to Figs. 3 and 4, the separate coils are indicated at 40 to 45, each coil in this case being fabricated from unstepped half turns of double ducted tubing as described in co-pending patent application Ser. No. 422,610, filed April 12, 1954. The drawing shows the winding overhang in which the ends of the two half turns constituting a single turn are connected together, but it will be understood that the overhang at the opposite end of the rotor will be similar except that one end of each turn will be connected to the beginning of the next turn.

In this arrangement the ends of each half turn are closed by solid inserts 40a, 40b, etc. which are secured in position by rivets 46 and brazed to the half turns so as to form a gas-tight seal. The joint pieces 42a, 42b, etc. of the coils 42 to 45 are arranged to increase in length progressively from the coil 42 to the coil 45. Solid insulating spacers 47 extending the full radial depth of the coils are fitted between the coils 42 and 43, between the coils 43 and 44, and between the coils 44 and 45.

Hydrogen is fed into the hollow conductors of the coils 40 and 41 through inlet ports 40c and 41c respectively located in the ends of the half turns and is exhausted through radial ports in the slot portion of the coils, as in the arrangement according to Figs. 1 and 2. As before, hydrogen is fed into the hollow conductors of the coils 42 to 45 through ports in the axially extending portion of the coil overhangs, some of the hydrogen being exhausted through the radial ports in the slot portion of the coils and the remainder being exhausted through axially extending ports in circumferentially extending parts of the coil overhangs. In this arrangement, however, the axially extending ports are formed by separate holes 48, 49, 50 and 51 drilled in the winding overhangs.

As shown in Fig. 3, the holes 48 are arranged to communicate only with the hollow conductors of the coil 42, the holes 49 to communicate only with the hollow conductors of the coil 43, the holes 50 to communicate only with the hollow conductors of the coil 44 and the holes 51 to communicate only with the hollow conductors of the coil 45. Separate independent outlet ducts are thus formed for every conductor of the coils 42 to 45.

Whilst all the outlet ducts are shown as being of the same cross sectional area, it will be appreciated that they need not necessarily be so; the holes communicating with the inner coils 42 and 43 may, for example, be made larger than those communicating with the outer coils 44 and 45 to compensate for the increased length of the duct.

It will be appreciated that, instead of the inlet ports 40c and 41c, the coils 40 and 41 may alternatively be provided with inlet ports in the straight portions of the winding overhangs and with outlet ports similar to those of the coils 42—45.

In either of the two arrangements described, the ports 32 in the straight part of the coil overhangs may be arranged alternatively to extend through the width of the conductor instead of through the depth of the conductor as shown. Curved guide pieces may be inserted in the ports to facilitate the smooth flow of hydrogen into the hollow conductors. A cooling medium other than hydrogen may, of course, be used.

What I claim as my invention and desire to secure by Letters Patent is:

1. A rotatable field member for a gas-cooled dynamo-electric machine having a shaft portion and a slotted core portion, a distributed hollow-conductor field winding disposed in the slots and having overhang portions at each end of said core portions arranged so as to form, with the adjacent shaft portion of the field member, an annular intake space for cooling gas, each pole of the field winding being formed from a plurality of concentric coils, cover means having a cylindrical portion and an end portion for each of the winding overhang portions, gas-inlet means at each end of the field member for admitting cooling gas to the respective annular intake spaces, gas-inlet port means in both sides of at least some of the coils in the axially extending parts of each winding overhang portion arranged to communicate with the respective annular intake spaces, first gas-outlet means in the sides of each corresponding coil intermediate the ends of the core portion of the field member for exhausting some of the gas radially from the hollow conductors, second gas-outlet means in the circumferentially extending parts of each corresponding coil overhang portion arranged to extend axially through the winding overhang portion from the innermost coil provided with ports to the end portion of the cover means, and vent means in the end portion of each cover means disposed in alignment with the adjacent gas-outlet means for exhausting the remainder of the cooling gas axially through the end portion of the cover means.

2. A rotatable field member for a gas cooled dynamo-electric machine having a shaft portion and a slotted core portion, a distributed hollow-conductor field winding disposed in the slots and having overhang portions at each end of said core portion arranged so as to form, with the adjacent shaft portion of the field member, an annular intake space for cooling gas, each pole of the field winding being formed from a plurality of concentric coils, cover means having a cylindrical portion and an end portion for each of the winding overhang portions, gas-inlet means at each end of the field member for admitting cooling gas to the respective annular intake spaces, gas-inlet port means in both sides of at least some of the coils in the axially extending parts of each winding overhang portion arranged to communicate with the respective annular intake spaces, first gas-outlet means in the sides of each corresponding coil intermediate the ends of the core portion of the field member for exhausting some of the gas radially from the hollow conductors, second gas-outlet means including two sets of gas-outlet ports in the circumferentially extending parts of each corresponding coil overhang portion, barrier means within the conductors for isolating the two sets of ports from each other, baffle means associated with the ports so as to define separate gas-exhaust ducts for each set of ports extending axially through the winding overhang portion from the innermost coil provided with ports to the end portion of the adjacent cover means, and aligned vents in the end portion of the adjacent cover means for exhausting the gas axially therethrough.

3. A rotatable field member for a gas-cooled dynamo-electric machine having a shaft portion and a slotted core portion, a distributed hollow-conductor field winding disposed in the slots and having overhang portions at each end of said core portion arranged so as to form, with the adjacent shaft portion of the field member, an annular intake space for cooling gas, each pole of the field winding being formed from a plurality of concentric coils, cover means having a cylindrical portion and an end portion for each of the winding overhang portions, gas-inlet means at each end of the field member for admitting cooling gas to the respective annular intake spaces, gas-inlet port means in both sides of at least some of the coils in the axially extending parts of each winding overhang portion arranged to communicate with the respective annular intake spaces, first gas-outlet means in the sides of each corresponding coil intermediate the ends of the core portion of the field member for exhausting some of the gas radially from the hollow conductors, second gas-outlet means including two sets of gas-outlet ports in the circumferentially extending parts of each corresponding coil overhang portion, barrier means within the conductors for isolating the two sets of ports from each other, baffle means associated with each set of gas-outlet ports so as to define separate gas exhaust ducts extending axially through the winding overhang portion from the innermost coil provided with ports to the end portion of the adjacent cover means, each of which communicates with the ports of those conductors of the separate coils of each pole which lie on the same radius, and aligned vents in the end portion of the adjacent cover means for exhausting the gas axially therethrough.

4. A rotatable field member according to claim 3, wherein the outside diameter of each of said shaft portions and the inside diameter of the end portions of each of said cover members are such that an annular clearance space is formed between each shaft portion and the end portion of the adjacent cover means which constitutes the gas-inlet means for the adjacent intake space.

5. A rotatable field member according to claim 4, including guide means secured to the end portion of said cover means for directing the gas issuing from said vents radially outwards from the field member.

6. A rotatable field member for a gas-cooled dynamoelectric machine having a shaft portion and a slotted core portion, a distributed hollow-conductor field winding disposed in the slots and having overhang portions at each end of said core portion arranged so as to form, with the adjacent shaft portion of the field member, an annular intake space for cooling gas, each pole of the field winding being formed from a plurality of concentric coils, cover means having a cylindrical portion and an end portion for each of the winding overhang portions, gas-inlet means at each end of the field member for admitting cooling gas to the respective annular intake spaces, gas-inlet port means in both sides of at least some of the coils in the axially extending parts of each winding overhang portion arranged to communicate with the respective annular intake spaces, first gas-outlet means in the sides of each corresponding coil intermediate the ends of the core portion of the field member for exhausting some of the gas radially from the hollow conductors, second gas-outlet means including two sets of gas-outlet ports in the circumferentially extending parts of each corresponding coil overhang portion, barrier means within the conductors for isolating the two sets of ports from each other, baffle means associated with the gas-outlet ports so as to define a separate gas exhaust duct extending axially through the winding overhang portion for each gas-outlet port, and aligned vents in the end portion of the adjacent cover means for exhausting the gas axially therethrough.

7. A rotatable field member according to claim 6, wherein said barrier means are arranged to extend within the conductors circumferentially past the gas-outlet ports in the corresponding conductors and wherein said baffle means comprise insulating packing pieces fitted in the spaces between the circumferentially extending portions of the coils, said barrier means and said baffle means being provided with ports aligned axially with the gas-outlet ports in the coils so as to form said separate axially extending exhaust ducts.

8. A rotatable field member according to claim 7, wherein the outside diameter of each of said shaft portions and the inside diameter of the end portions of each of said cover members are such that an annular clearance space is formed between each shaft portion and the end portion of the adjacent cover means which constitutes the gas-inlet means for the adjacent intake space.

9. A rotatable field member according to claim 8, including baffle means in the gas-inlet ports for diverting some of the gas towards said first gas-outlet means and the remainder of the gas towards said second gas-outlet means.

References Cited in the file of this patent
UNITED STATES PATENTS 2,653,255     Baudry _____ Sept. 22, 1953

FOREIGN PATENTS 714,319     France _____ Sept. 1, 1931